(12) United States Patent
Sanders et al.

(10) Patent No.: US 6,688,271 B2
(45) Date of Patent: Feb. 10, 2004

(54) SWITCHING-TYPE INTAKE PIPE

(75) Inventors: Michael Sanders, Kaarst (DE); Frank Langner, Wuerselen (DE)

(73) Assignee: Pierburg GmbH, Neuss (DE)

( * ) Notice: Subject to any disclaimer, the term of this patent is extended or adjusted under 35 U.S.C. 154(b) by 0 days.

(21) Appl. No.: 10/259,092

(22) Filed: Sep. 27, 2002

(65) Prior Publication Data

US 2003/0062014 A1 Apr. 3, 2003

(30) Foreign Application Priority Data

Oct. 2, 2001 (DE) .......................... 101 48 601

(51) Int. Cl.[7] .................................. F02N 1/00
(52) U.S. Cl. .................................. 123/184.55; 251/84
(58) Field of Search .................. 123/184.55; 251/84, 251/85

(56) References Cited

U.S. PATENT DOCUMENTS 6,073,601 A * 6/2000 Guichard et al. ...... 123/184.55

FOREIGN PATENT DOCUMENTS

DE 197 14 311 10/1998

* cited by examiner

Primary Examiner—Tony M. Argenbright
Assistant Examiner—Katrina Harris
(74) Attorney, Agent, or Firm—Ohlandt, Greeley Ruggiero & Perle LLP

(57) ABSTRACT

A switching-type intake pipe for internal combustion engines comprises an intake duct with a shorting aperture. The shorting aperture can be closed and opened by a switching flap. The switching flap is connected via a non-rigid connection with a flap lever. The connection between the flap lever and the switching flap is formed by a plate on the one side and a calotte on the other side. Thus, a tiltable connection, which is easy to manufacture and install, is produced between the switching flap and the flap lever.

7 Claims, 1 Drawing Sheet

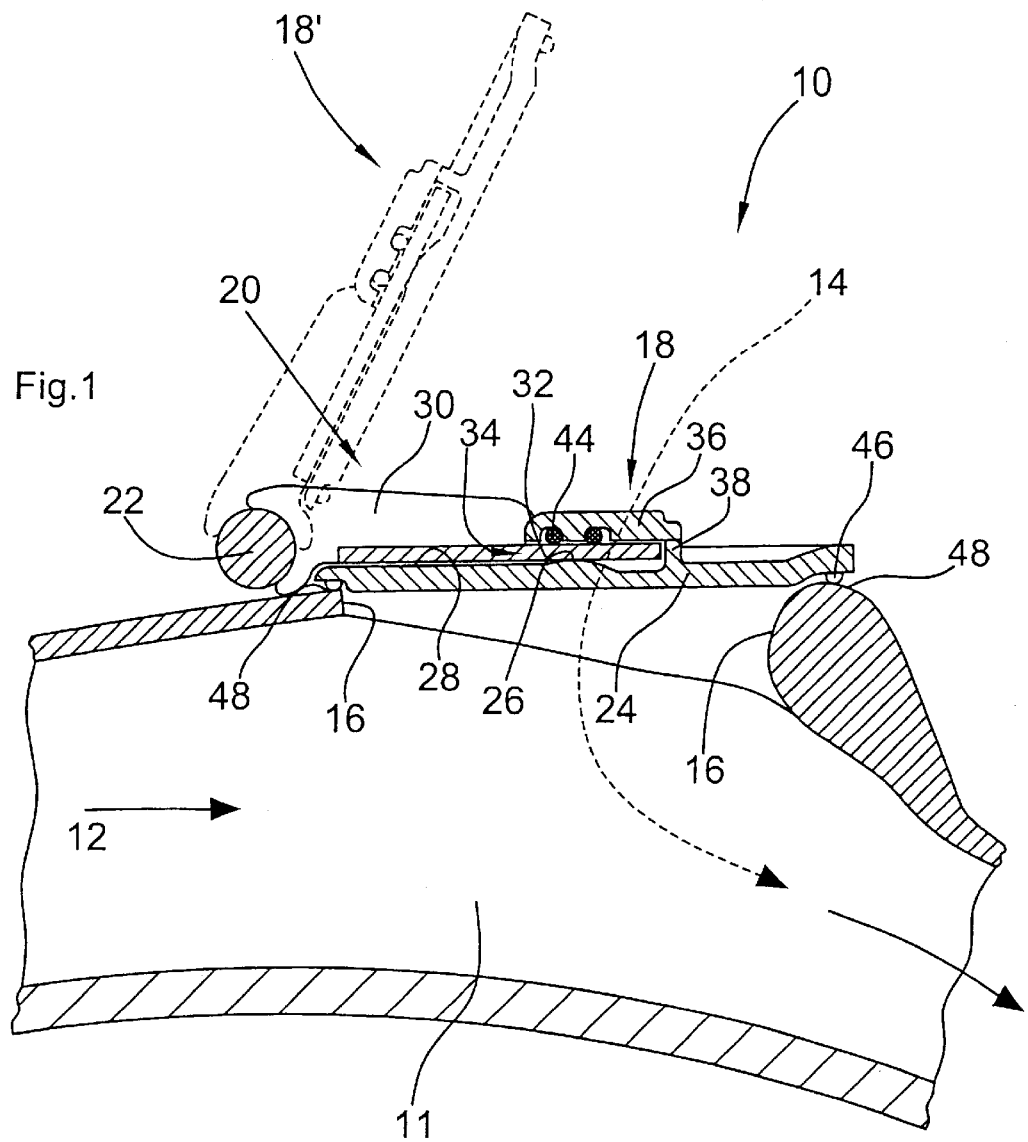
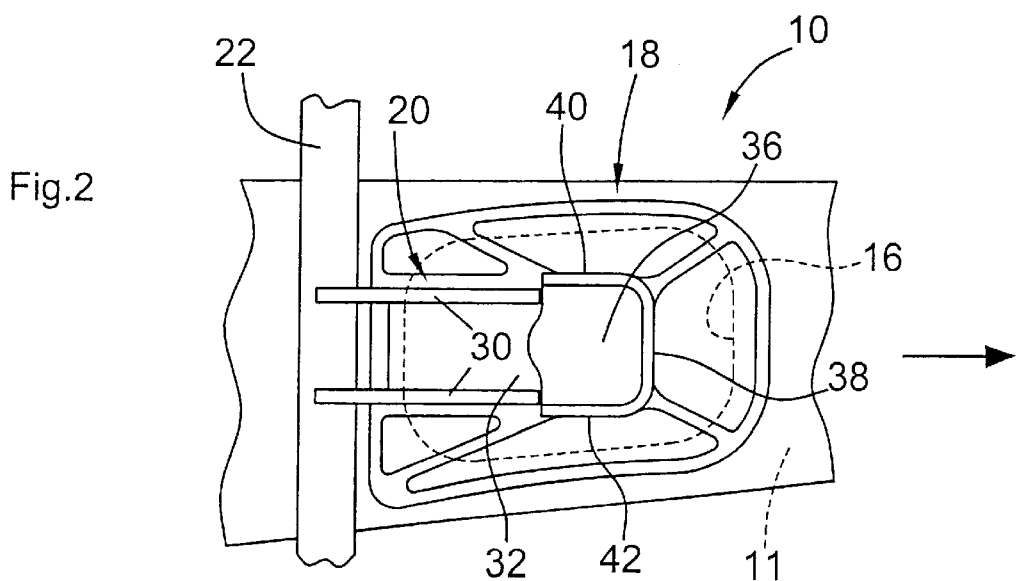

SWITCHING-TYPE INTAKE PIPE

BACKGROUND OF THE INVENTION

The present invention relates to a switching-type intake pipe for internal combustion engines.

Switching-type intake pipes are used to improve the filling of the cylinder spaces with combustion air. This is realized by adapting the effective intake pipe length to the engine speed. While a long intake pipe leads to good charging in the lower speed range, the same applies to a short intake pipe at high speeds. To be able to adapt the intake pipe length to the engine speed in a simple manner, switching-type intake pipes having a shorting aperture are used. Said shorting aperture is provided at the cylinder-side end of the intake duct and can be closed and opened by a switching flap. By opening and closing said switching flap the effective length of the intake pipe can be reduced or increased and thus adapted to the engine speed. In the case of a rigid connection of the switching flap with a flap lever there is the danger of the shorting aperture not being capable of being completely closed on its closing seat when the switching flap is only slightly tilted and/or canted. From DE 197 14 311 a switching-type intake pipe is known where the switching flap is fastened via a ball-and-socket joint to the flap lever such that said flap is tiltable within narrow limits. The ball-and-socket joint is formed by a spherical part a in a corresponding hollow space. Said spherical part comprises a narrow neck which is susceptible to break. Further, the spherical part and the corresponding hollow space of the counterpart are difficult to manufacture.

SUMMARY OF THE INVENTION

It is an object of the present invention to provide a simple and non-rigid connection of the flap lever with the switching flap.

In the switching-type intake pipe according to the present invention the connection between the flap lever and the switching flap is formed by a plate on the one side and a calotte on the other side via which, in the closing position of the switching flap, the closing force is transmitted, at each tilting angle, from the flap lever to the switching flap. Said plate/calotte assembly only serves for transmitting pressure forces from the flap lever to the switching flap, but not for retaining the switching flap at the flap lever.

The convex calotte occupies a solid angle of less than 180° and does thus not comprise any constriction weakening the strength of fastening the calotte to the switching flap or the flap lever. Since the calotte is fastened to the switching flap and/or the flap lever without any undercuts being present, manufacture of said calotte is easy and inexpensive. The same applies to the counterpart of the calotte, namely the plate, which is of flat configuration or, at most, of concave configuration with a large radius. The plate, too, can be inexpensively manufactured with simple means. The calotte and the plate must not be of particularly accurate configuration to ensure good tiltability of the switching flap with respect to the flap lever. The tiltabilty makes sure that the switching flap can position itself gap-free onto the aperture seat of the shorting aperture. This ensures that the shorting aperture can be completely closed such that no undesired short-circuit occurs.

According to a preferred aspect of the present invention the switching flap comprises the calotte, and the the flap lever comprises the plate. Generally, it is also possible that the switching flap comprises the plate, and the flap lever comprises the calotte.

According to a preferred aspect of the present invention the calotte is arranged approximately in the areal gravity center of the switching flap. This ensures that the closing force is applied by the flap lever to approximately the middle of the switching flap. Thus approximately the same pressure is applied to the overall circumference of the closing seat such that a good sealing effect is attained over the overall circumference.

According to a preferred aspect of the present invention the calotte is integrally formed with the switching flap. Separate manufacture of a connecting part and subsequent assembly with the switching flap are thus not necessary.

Preferably, the height of the calotte is selected such that the tilting angle of the switching flap amounts to at least 1.0° in each direction. This ensures that unevennesses of the closing seat or changes in the position of the switching flap and/or the shorting aperture occurring during assembly and/or caused by heat can be compensated for.

According to a preferred aspect of the present invention the switching flap comprises an insertion pocket containing the calotte, into which pocket the flap-lever plate is inserted. Via the calotte and the opposite plate only pressure forces can be transmitted. To retain the switching flap at the flap lever and to allow simple assembly, the switching flap thus comprises the insertion pocket on its rear side, in which pocket the plate attached to the flap lever is inserted. For attaching the switching flap to the flap lever, the flap-lever plate is simply inserted into the insertion pocket of the switching flap and prevented from undesiredly falling off the flap-lever plate by means of a snapping or fasting means. This allows simple assembly and/or disassembly.

According to a preferred aspect of the present invention an elastic tensioning element is arranged between the rear side of the plate and an insertion pocket wall. Said tensioning element may be a simple elastic pressure body which presses the flap-lever plate against the calotte of the switching flap. Further, the tensioning element clamps the flap-lever plate in place in the insertion pocket such the flap-lever plate is prevented from undesiredly slipping out of the insertion pocket.

BRIEF DESCRIPTION OF THE DRAWINGS

Hereunder an embodiment of the present invention is explained in detail with reference to the drawings in which:

FIG. 1 shows a longitudinal section of a portion of a switching-type intake pipe with a shorting aperture and a switching flap, and FIG. 2 shows a top view of the switching-type intake pipe portion shown in FIG. 1.

DESCRIPTION OF THE PREFERRED EMBODIMENT

FIGS. 1 and 2 show a portion of a switching-type intake pipe 10 of an air intake system comprising a plurality of switching-type intake pipes for a multi-cylinder internal combustion engine. Via the switching-type intake pipe 10 combustion air is fed to a cylinder of the internal combustion engine, i.e. via a long intake path 12 or a short intake path 14. For this purpose the switching-type intake pipe 10 is provided with a shorting aperture 16 at its cylinder-side portion, which aperture 16 can be closed by a switching flap 18. Said switching flap 18 is fastened to a flap lever 20 which is fixedly attached to a rotatable lever shaft 22.

At low speeds of the internal combustion engine the switching flap 18 is in its closing position and closes the shorting aperture 16. The air taken in is exclusively fed via the long intake path 12 into the cylinder of the internal combustion engine. At higher speeds the switching flap 18 is pivoted into its opening position 18'. This is effected by a corresponding shaft drive by which the lever shaft 22 can be rotated by approximately 40°, whereby the switching flap 18 is pivoted into its opening position. In the opening position 18' of the switching flap 18 the intake air can travel on the short path 14 to the switching-type intake pipe. At low speeds the lever shaft 22 is rotated back by its drive, and the switching flap 18 is pivoted into its closing position.

The switching flap 18 is formed by a plate body 24 comprising a calotte 26 in its middle and on the exterior of the duct. Said calotte 26 occupies a solid angle of approximately 30°, has a radius of approximately 15 mm, and projects by approximately 1.0 mm beyond the rear-side surface 28 of the switching flap 18.

The flap lever 28 is formed by two lever blades 30 arranged parallel and at a distance to each other, and a plate 32 held by the two lever blades 30 in a transverse plane. Said plate 32 projects radially to the outside beyond the radial ends of the two lever blades 30. Said projecting part of the completely flat and plane plate 32 is inserted into an insertion pocket 34 which is formed by an insertion pocket cover 36 with corresponding insertion pocket side walls 38,40,42. Said insertion pocket cover 36 and the insertion side walls, respectively, are bonded with the flap body 24.

On the inside of the insertion pocket cover 36 a rubber-elastic elastomer ring 44 configured as an elastic tensioning element is fastened, via which ring 44 the plate 32 is pressed onto the calotte 26, and further the plate 32 is fixedly clamped in place in the insertion pocket 34.

The plate body 24 comprises a peripheral rubber-elastic sealing lip 46 which is pressed to the peripheral closing seat 48 of the shorting aperture 16 when the switching flap 18 is closed.

The height of the calotte and the dimensions of the insertion pocket are selected such that they produce a pivoting angle of the switching flap 18 relative to the lever plate 32 of approximately 1.0° and/or allow a pivoting movement of approximately 0.5 mm at each corner of the switching flap 18.

Thus a switching flap/flap lever assembly which is easy to manufacture and assemble and tiltable within narrow limits is created.

Although a preferred embodiment of the invention has been specifically illustrated and described herein, it is to be understood that minor variations may be made without departing from the spirit and scope of the invention, as defined in the appended claims.

What is claimed is:

1. Switching-type intake pipe for internal combustion engines, comprising:

an intake duct having a shorting aperture, a switching flap for closing and opening the shorting aperture, and a driven flap lever connected with the switching flap by a non-rigid connection and adapted for actuating said switching flap, wherein the connection is formed by a plate on the one side and by a calotte on the other side.

2. Switching-type intake pipe according to claim 1, wherein the switching flap comprises the calotte, and the flap lever comprises the plate.

3. Switching-type intake pipe according to claim 2, wherein the calotte is integrally formed with the switching flap.

4. Switching-type intake pipe according to claim 2, wherein the calotte is arranged approximately in the middle of the switching flap.

5. Switching-type intake pipe according to claim 1, wherein the height of the calotte is selected such that the tilting angle of the switching flap amounts to at least 1.0° in each direction.

6. Switching-type intake pipe according to claim 2, wherein the switching flap comprises an insertion pocket containing the calotte, into which pocket the flap-lever plate is inserted.

7. Switching-type intake pipe according to claim 6, wherein between the rear side of the plate and an insertion pocket wall an elastic tensioning element is arranged which presses the plate onto the calotte.

* * * * *